United States Patent [19]
Torrey

[11] Patent Number: 5,483,148
[45] Date of Patent: Jan. 9, 1996

[54] SINGLE-PHASE ACTIVE POWER FILTER FOR MULTIPLE NONLINEAR LOADS AND METHOD THEREFOR

[75] Inventor: David A. Torrey, Ballston Spa, N.Y.

[73] Assignee: Rensselaer Polytechnic Institute, Troy, N.Y.

[21] Appl. No.: 195,770

[22] Filed: Feb. 14, 1994

[51] Int. Cl.$^6$ .................. G05F 1/70; H02J 1/02
[52] U.S. Cl. .................. 323/205; 323/207; 307/105
[58] Field of Search .................. 323/205, 207, 323/212, 217, 222; 307/3, 4, 102, 103, 105, 108, 127; 327/13, 28–30, 103, 182, 362

[56] References Cited

U.S. PATENT DOCUMENTS

| | | | |
|---|---|---|---|
| 4,906,860 | 3/1990 | Asaeda | 307/105 |
| 5,162,983 | 11/1992 | Kumagai | 363/39 |
| 5,239,367 | 8/1993 | Sato | 358/21 R |
| 5,321,598 | 6/1994 | Moran | 363/41 |
| 5,397,927 | 3/1995 | Suelzle et al. | 307/105 |
| 5,430,364 | 7/1995 | Gibson | 323/207 |
| 5,436,550 | 7/1995 | Arakawa | 323/222 |

OTHER PUBLICATIONS

Wojciak and Torrey, Oct. 1992 IEEE Industry Application Society Annual Meeting Record.

*Primary Examiner*—Matthew V. Nguyen
*Attorney, Agent, or Firm*—Notaro & Michalos

[57] ABSTRACT

An active filter and method for stabilizing a single-phase ac line to which multiple nonlinear loads are connected, comprises two pairs of switches connected in two switching loops across a capacitor. One loop is connected to one leg of the line through an inductor and the other loop is connected to the other leg of the line directly. Voltage from the capacitor is followed and averaged to produce a scaling factor which is multiplied by a value corresponding to the actual ac line voltage. The resulting trajectory for the line current is compared to the actual line current and used to switch the pair of switches in the first loop to shape of the line current. A zero-crossing detector connected to receive the ac line voltage determines the polarity of the shaped current.

11 Claims, 5 Drawing Sheets

SINGLE-PHASE ACTIVE POWER FILTER FOR MULTIPLE NONLINEAR LOADS AND METHOD THEREFOR

FIELD AND BACKGROUND OF THE INVENTION

The present invention relates in general to active power filters, and in particular to a new and useful apparatus and method for compensating nonlinear currents drawn by different loads such as electronic power supplies or motor drives which are known to draw nonsinusoidal (nonlinear) currents.

The problem of nonsinusoidal line currents created by nonlinear power electronic loads is well documented. The pulsating currents drawn by uncontrolled rectifier bridges are often corrected using a "high power-factor preregulator", which is an uncontrolled rectifier loaded by a boost converter. High power-factor preregulators are discussed in L. H. Dixon, Jr., "High power factor preregulators for off-line power supplies," *Unitrode Power Supply Design Seminar*, Topic 6, 1988. The boost converter is controlled to draw a current from the rectifier which has the same shape as the input voltage. The boost converter must process all of the load power.

Sliding-mode control is concerned with forcing one or more variables (often, but not necessarily, state variables) to follow a specific trajectory. See, J. J. Slotine and W. Li, *Applied Nonlinear Control*, Englewood Cliffs, N.J.: Prentice-Hall, 1991. The trajectory is known as the sliding surface. The location of the variables relative to the sliding surface governs the control law which is applied to the system. As the system variables of interest pass through the sliding surface, the control law changes. The nonlinear control law is chosen so that regardless of where the system is with respect to the sliding surface, control actions always drive the system toward the sliding surface. Power electronic systems are natural candidates for sliding-mode control because the topology of the circuit changes with the operation of the switches. See, A. Sabanovic, N. Sabanovic and O. Music, "Sliding mode control of dc-ac converter," *IEEE Power Electronics Specialists Conf. Rec.*, pp. 560–566, 1988. This "varying structure" of the system leads to the nonlinear control law which forces the system back to the sliding surface. Sliding-mode control of a three-phase active power filter is discussed in P. F. Wojciak and D. A. Torrey, "The design and implementation of active filter systems using variable structure system concepts, "*IEEE IAS Annual Meeting Conf. Rec.*, pp. 850–857, Houston, Tex., 1992; the present invention expands and modifies this control law which was co-authored by the present inventor.

SUMMARY OF THE INVENTION

The apparatus of the present invention includes an inverter which is used as an active filter and contains switches which force an inductor current $i_L$, which is connected to the ac line, to follow whatever shape is necessary such that the total load current drawn by the filter and nonlinear loads connected to the same ac line, is of the correct magnitude and of the same shape as the input voltage. A capacitor is connected between the switches which are arranged in parallel pairs, connected to opposite poles of the ac line. A controller which operates the switches according to a control rule of the invention, uses the capacitor voltage to generate a scaling factor based on the real power demand of the loads. The scaling factor is advantageously used to multiply a quantity representing the line voltage to produce a trajectory for the line current, which is then compared to the actual line current. The comparison value is then used at a decision frequency, which is selected to be at least twice the highest switching frequency for the switches, to switch the first pair switches which controls the magnitude of the current. The second pair of switches are connected to a zero-crossing detector to establish the shape of the desired line current.

Additionally, it is also an object of the present invention to provide a process for using the invention as disclosed to filter a single phase ac line. Accordingly, this is accomplished by connecting a first switching loop containing a capacitor to an inductor, then connecting a second switching loop which also contains the capacitor directly to one leg of the ac line and connecting the inductor to the other leg of the ac line. Using the voltage across the capacitor, a scaling factor is generated based on an average dc voltage across the capacitor. A trajectory for the line current is then formed based on using the scaling factor and scaling the line voltage. Next, the actual line current of the ac line is compared to the trajectory line current. The shape of the line current is controlled using the first switching loop based on the comparison between the actual line current and the calculated trajectory for the line current. Also, the second switching loop is controlled based on a detected voltage plurality for the ac line while the line current is being shaped, in order to make the line current follow the phase of the line voltage.

Additionally, the scaling factor can be generated by using a low pass filter on the capacitor voltage to cause the phase to follow the capacitor voltage or the trajectory for the line current could be formed by multiplying the scaling factor by the ac voltage. The process can also include a detecting the zero crossing for the line voltage in order to indicate the plurality of the line voltage.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
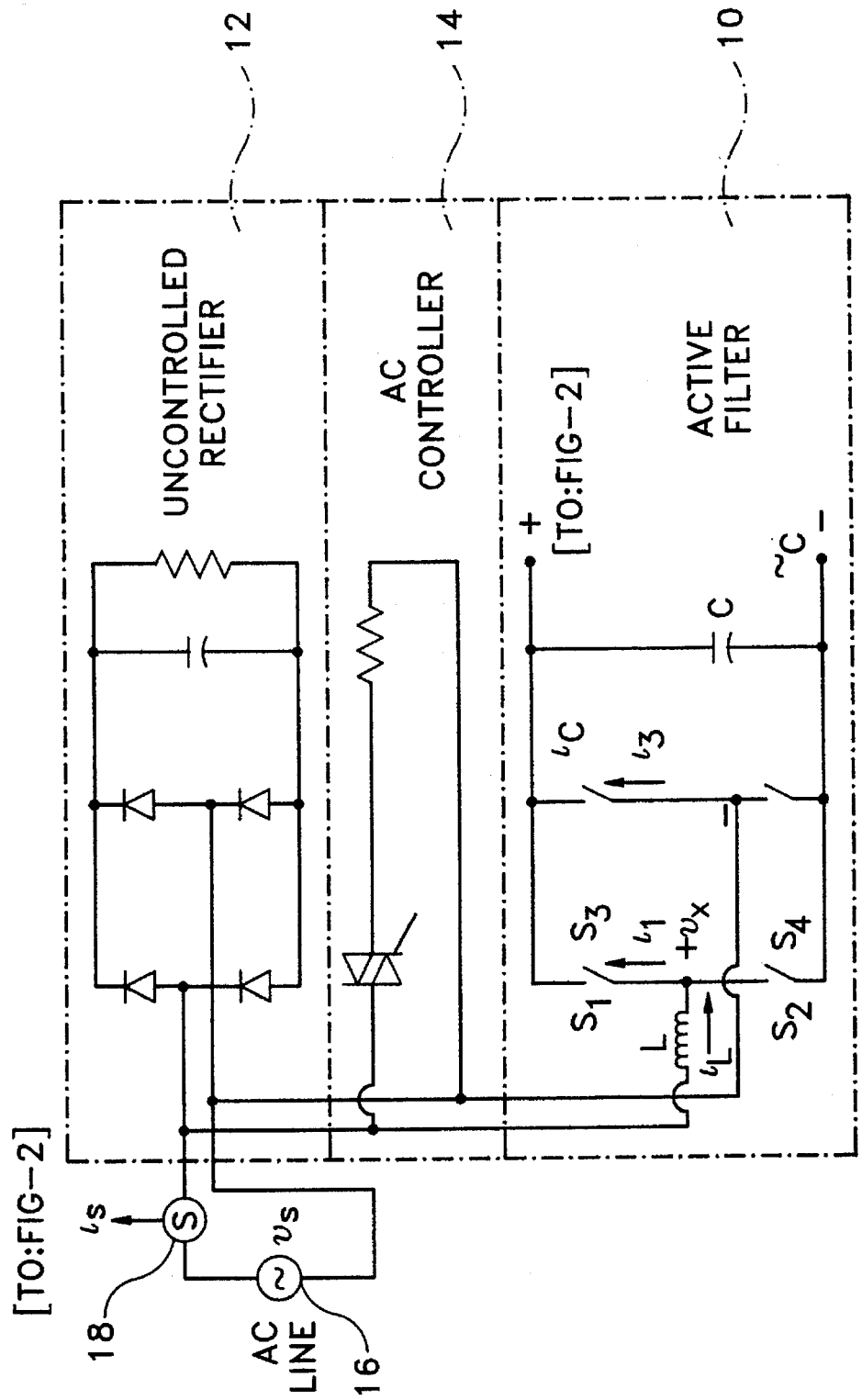
FIG. 1 is a schematic circuit diagram of the single-phase inverter used as an active filter of the present invention, used in conjunction with two nonlinear loads serviced by a single-phase ac line.
Figure 2:
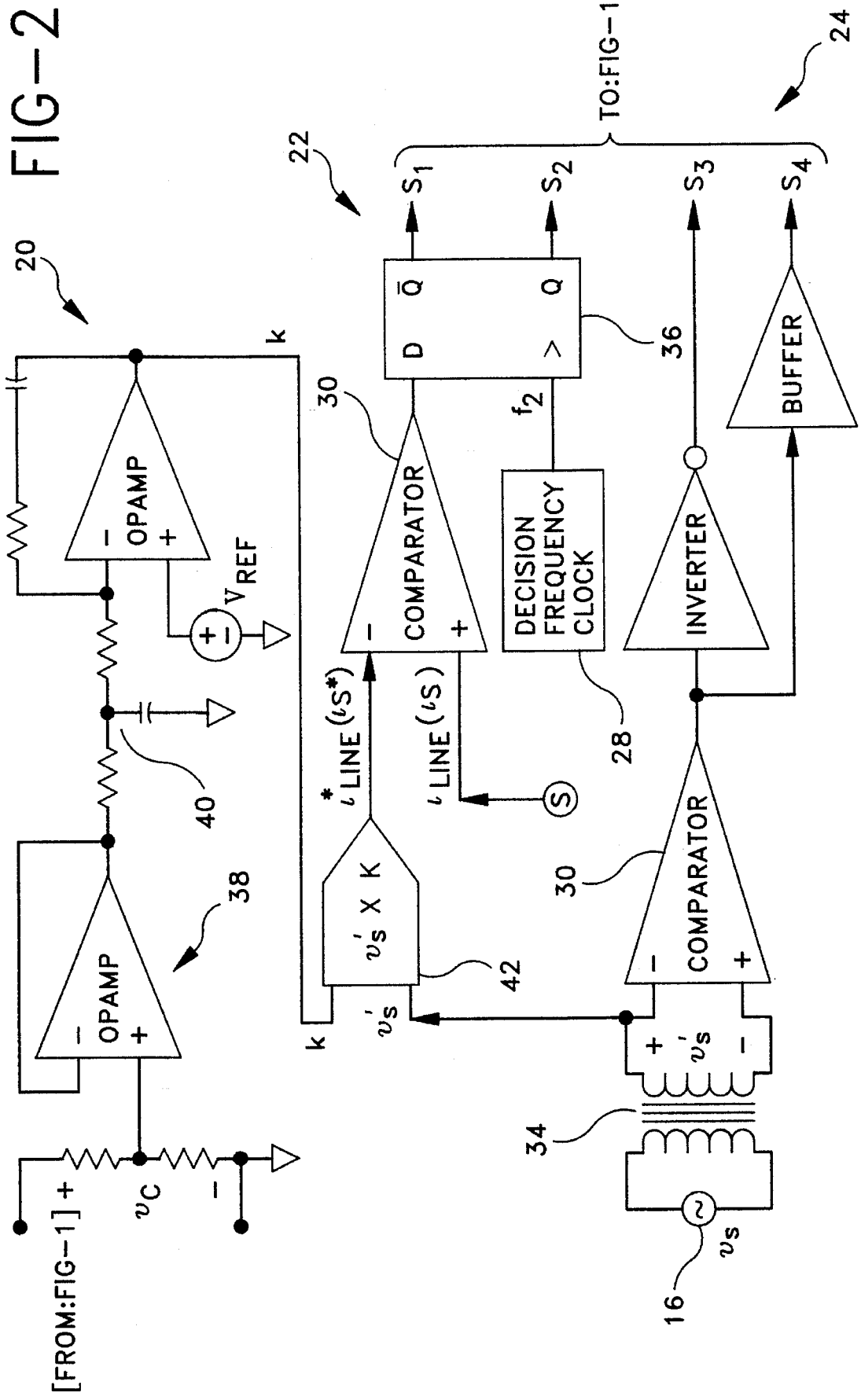
FIG. 2 is a schematic diagram illustrating a PI controller and hardware for implementing a slide-mode control law of the present invention.
Figure 3:
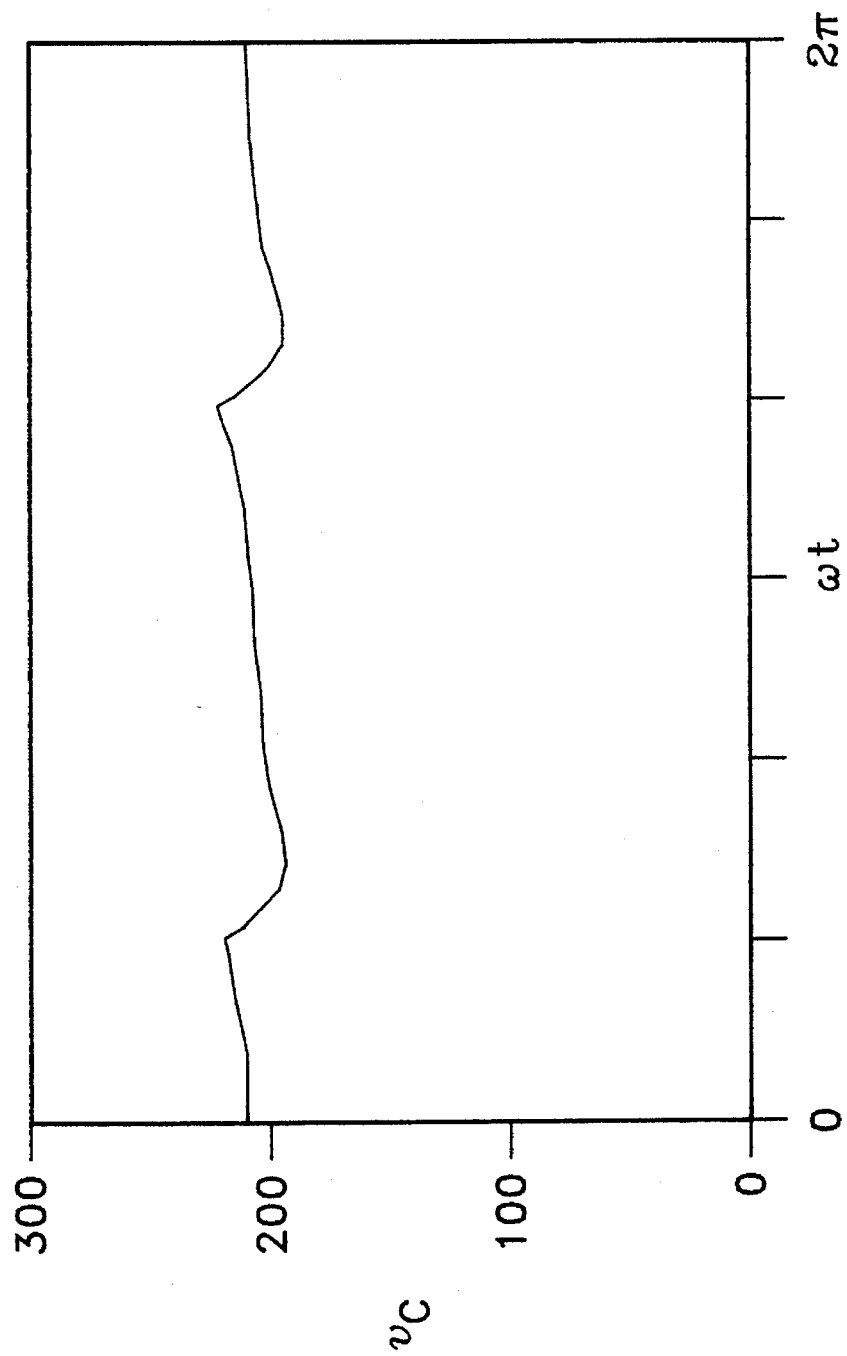
FIGS. 3, 4 and 5 are graphs plotting $v_c$, $i_c$, and currents $i_s$ and $i_L$ against time.
Figure 4:
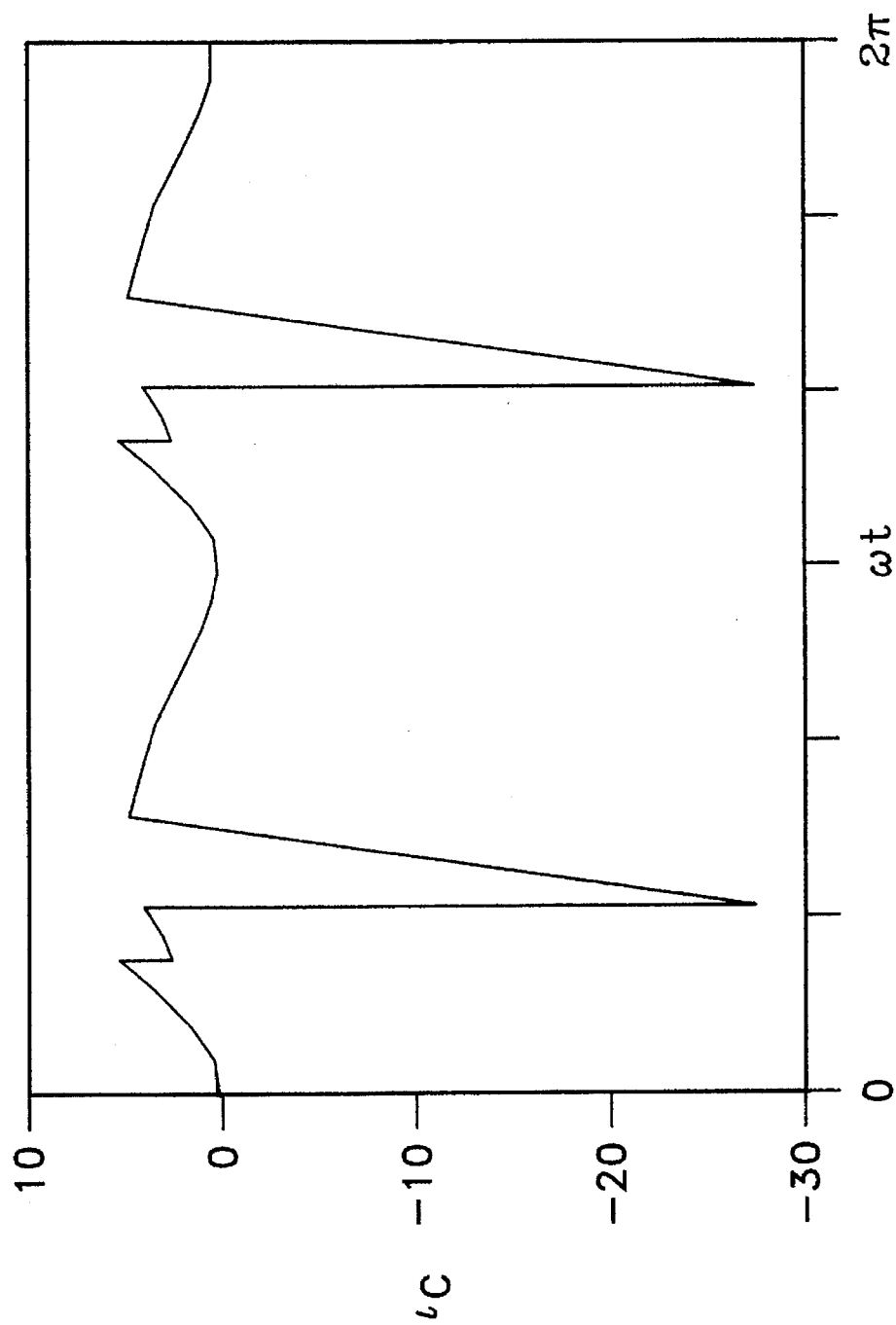
Figure 5:
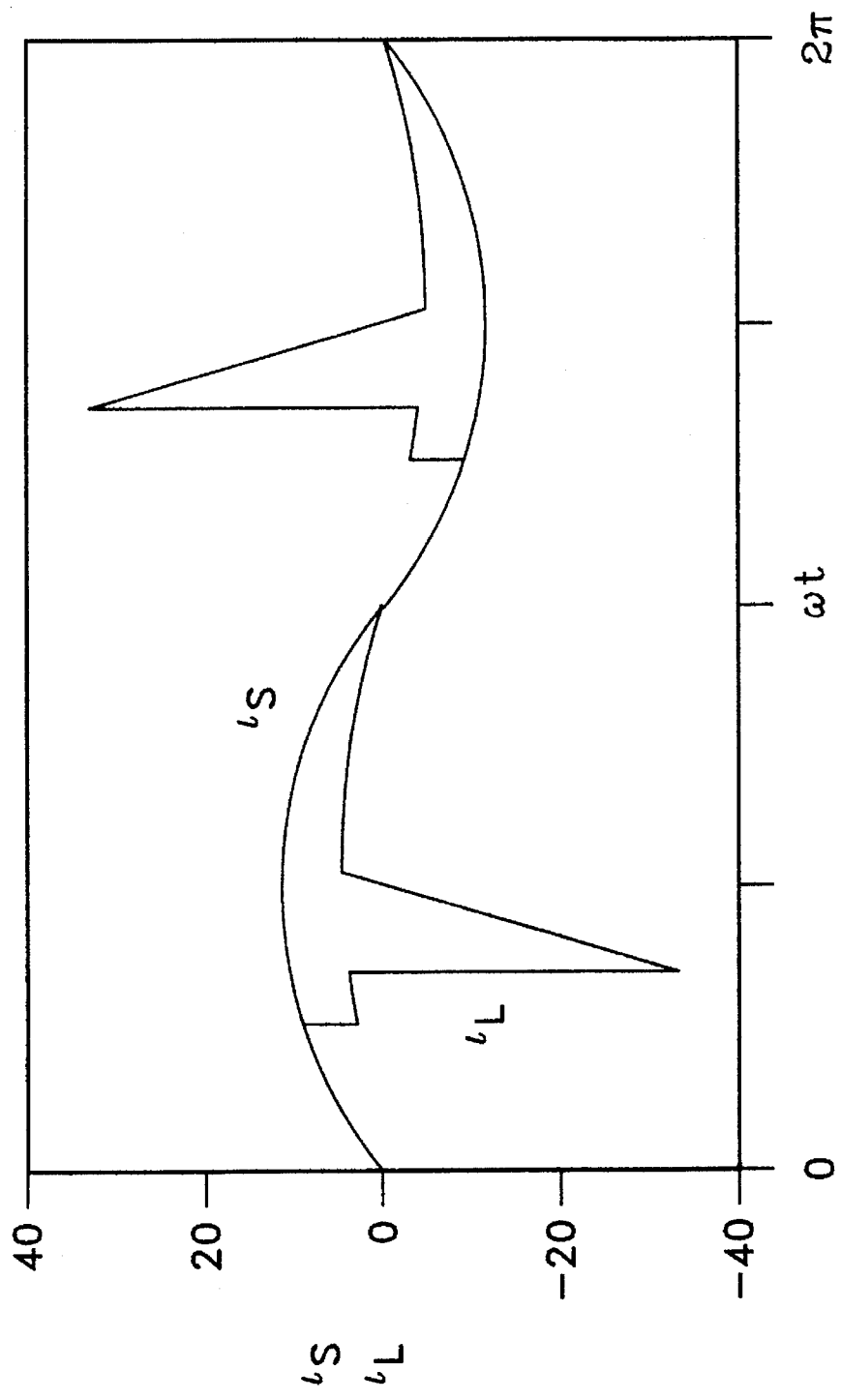

Referring to the FIGS. 1 and 2, the invention embodied therein comprises a single-phase inverter within box 10, which acts as an active filter of the present invention in a system which may include such nonlinear power electronic loads as an uncontrolled rectifier 12 and an ac controller 14, which draw electrical energy from an ac line shown schematically at 16, supplying a line voltage $v_S$ and line current $i_S$ sensed by a current sensor 18. One or more nonlinear loads with or within one or more linear loads (which are of no consequence to the present invention) can be serviced using the present invention.

Active filter 10 comprises four switches $S_1$, $S_2$, $S_3$ and $S_4$, which are operated in a manner which forces an inductor current $i_L$, to follow what ever shape is necessary so that total load current $i_S$, drawn by the filter 10, and the nonlinear loads 12 and 14, are of the correct magnitude and of the same shape as the input voltage $v_S$. According to one embodiment of the invention, each switch is implemented as an IGBT with an antiparallel diode connected across the transistor. Any other known devices of similar behavior can be used as the switches, however. A capacitor C is connected across the switches in the manner shown in FIG. 1. The nominal capacitor voltage $v_c$ must be larger than the peak of the ac line source 16. This enables $i_L$ to be shaped as required at any point in a line cycle, 0 to $2\pi$, e.g. 1/60 sec.

Assuming $v_C > |v_s|$, during the positive half cycle of the source voltage, $i_L$ can be made more positive by making $v_x = v_C$, During the negative half cycle of the source voltage, $i_L$ can be made more negative by making $v_x = 0$; $i_L$ can be driven toward zero by making $v_x = -v_C$. From this heuristic understanding of the circuit operation, one can conclude that the two legs of the inverter 10 can be used for different tasks. Specifically, switches $S_3$ and $S_4$ can be used to force $v_x \leq 0$ and $v_x \geq 0$, respectively, while switches $S_1$ and $S_2$ are used to selectively shape $i_L$.

For the active filter of the invention, the object is to force the source current to be the same shape as, and in phase with, the source voltage. To this end, a trajectory $i_s^*$ for the line current is defined to be where k is a scaling factor based on the real power demand of the loads. The proper value of k is determined by a voltage controller 20 in FIG. 2. According to the invention control over the line current is achieved with the nonlinear control law described in Table 1. The control actions summarized in Table 1 form the kernel of control actions for the current controller.

TABLE 1

|  | $i_s < kv_s$ | $i_s > kv_2$ |
|---|---|---|
| $u_1$ | 0 | 1 |
| $u_2$ | 1 | 0 |
|  | $v_s < 0$ | $v_s > 0$ |
| $u_3$ | 1 | 0 |
| $u_4$ | 0 | 1 |

Where $u_1$ to $u_4$ are 0 when switches $S_1$ to $S_4$ are open, and $u_1$ to $u_4$ are 1 when switches $S_1$ to $S_4$ are closed.

The inner current loop with switches $S_3$ and $S_4$ uses the sliding-mode control law given in Table 1 to shape the line current. The outer voltage loop with $S_1$ and $S_2$ dictates the magnitude of the line current through the proportional-integral (PI) control law which regulates the average capacitor voltage. If k is too large (or small), power flow dictates that the average capacitor voltage must increase (or decrease) as the capacitor absorbs (or delivers) the excess (or deficit) power delivered by the source.

The sliding-mode control law of Table 1 is implemented with the circuit shown in FIG. 2 at 22 and 24. This implementation bases control actions on a constant decision frequency $f_2$ supplied by a circuit 28. At regular intervals, the actual line current $i_s^*$ and the desired or trajectory line current $i_s^*$ are compared in a comparator 30 and the positions of switches $S_1$ and $S_2$ are updated accordingly. Switches $S_3$ and $S_4$ operate based on whether the source voltage as sensed by a comparator 32 and supplied by a transforms 34 at $v_S'$, is negative or positive, respectively.

As shown in FIG. 2, the control actions are accomplished by continuously comparing the actual and desired line currents and clocking this information to the gates of switches $S_1$ and $S_2$ at the decision frequency and in a flip-flop 36. Note that the greatest switching frequency is one-half of the decision frequency $f_2$. An example range of the decision frequency $f_2$ 10 kHz to 100 kHz. Optimum was at about 48 kHz in the disclosed embodiment. Switches $S_3$ and $S_4$ are synchronized to the line voltage through a zero-crossing detector formed by comparator 32 and transformer 34.

The linear controller 20 consists of a voltage divider and follower 38 which is used to sense the instantaneous capacitor voltage $v_C$, which is subsequently put through a low-pass filter 40 which attenuates all but the dc component. This filtered, or averaged, capacitor voltage is then fed to an op amp of the PI controller 20, which outputs the desired value of k. The desired current waveform is then generated by multiplying k and a value corresponding to line voltage $v_S$, that is $v_S'$ in an analog multiplier 42. The product $i_s^*$ is compared in comparator 30 to the line current $i_s$ sensed in line current sensor 18.

The bandwidth of the linear controller controls the harmonic content of the line current to a large extent. That is, if k is allowed to vary significantly over one line cycle, the sliding-mode controller is going to force line current ($i_s$) to be a different shape than $v_S$. However, this low bandwidth does not present a problem so long as the capacitor voltage is not allowed to dip below $|v_s|$ or rise above the voltage rating of the switches.

If large, rapid load changes are expected, a sampled-data controller can be implemented which updates the value of k at each zero crossing of the source voltage, thereby allowing much more rapid changes in k without introducing distortion into the line current. A high power-factor preregulator which used a digital controller is discussed in C. P. Henze and N. Mohan, "A digitally controlled ac to dc power conditioner that draws sinusoidal input current," *IEEE Power Electronics Specialists Conf. Rec.*, pp. 531–540, 1986, for example.

Advantages of the invention follow:

The maximum switching frequency of the power devices is limited. Alternative hysteretic controllers must be very concerned with limiting the maximum switching frequency of the power devices. With the sliding-mode controller of the invention as implemented, the maximum switching frequency is at most one half of the decision frequency. The decision frequency is set as the frequency of an oscillator 28.

The control used with the active filter of the invention is efficient because switches only change state when the actual line current passes through the desired line current. In some pulse-width modulation (PWM) control strategies, switches are operated on regular intervals whether the change in state is needed or not.

The control used with active filter of the invention is also efficient because only two switches $S_1$ and $S_2$, are operated at high frequency. As described above, switches $S_3$ and $S_4$ operate at the line frequency of the source, not at frequencies approaching the decision frequency. This helps to keep switching and snubbing losses to a minimum.

The spectrum of the remaining distortion in the source current is broad. That is, the remaining distortion components of the source current occur at varying frequencies which cover a broad range of the frequency spectrum. The variation in frequency is caused by allowing switches $S_1$ and $S_2$ to change state only as allowed by the decision frequency oscillator. In addition, switching events do not always happen whenever they are allowed to occur, because the actual source current may not have passed through the desired source current. PWM controllers typically have the remaining distortion components showing up at regularly spaced frequency intervals about the switching frequency.

There are also other ways to realize the active filter controller of the invention. Some examples include:

With regard to the voltage follower and the low-pass filter:
(a) It is possible to incorporate the low-pass filter and voltage follower functions into one op amp circuit, thereby creating a low-pass filter with greater attenuation of high frequencies.
(b) It is possible to eliminate the voltage follower and the low-pass filter if these functions are incorporated into a digital controller.

With regard to PI controller:
(a) It is not really necessary to use a PI controller because of the small-signal response of active filter. That is, the active filter incrementally looks like an inductor. Because of this, a stable controller with zero steady-state error could be realized simply with a proportional controller.
(b) It is possible to use a digital implementation to generate k, rather than the analog circuit employed. A digital controller may employ a digital processor which executes an algorithm which essentially performs the same functions as the analog PI controller described above. A digital controller could also use purely digital hardware elements which allow k to vary much more rapidly, but the rapid variations are synchronized to the source voltage so that undesired harmonics are still eliminated. A sample digital controller which describes this operation in spirit is presented in C. P. Henze and N. Mohan, "A digitally controlled ac to dc power conditioner that draws sinusoidal input current."

With regard to the analog multiplier:
(a) The multiplier function could be incorporated into a digital controller, as either a step in an algorithm, through the use of a multiplying D/A converter, or through some similar means.

With regard to the discrete digital circuitry employed in the controller:
(a) It is not guaranteed that the circuit realization provided here is the minimum possible. Other realizations may perform the same functions with a slightly lower gate count. It is the best mode now contemplated, however.
(b) Most, if not all, of the digital components used in the circuit could be merged into one component if a programmable logic array or similar device were used.

With regard to the gate drive circuits for the controllable switches:
(a) There are many ways to turn controllable switches on and off. The approach described here uses high-voltage integrated circuits which require a minimum of discrete components to support their function. Many other alternatives exist, but for a given type of device, their function will be similar.

While a specific embodiment of the invention has been shown and described in detail to illustrate the application of the principles of the invention, it will be understood that the invention may be embodied otherwise without departing from such principles.

What is claimed is:

1. A single-phase active power filter for multiple nonlinear loads and attachable to a pair of opposite legs of a single-phase ac line, comprising:

a first switching loop containing a capacitor for carrying a capacitor voltage;

a second switching loop also containing the capacitor and being directly connected to a first leg of the pair of legs of the ac line;

an inductor for carrying an inductor current connected between the first switching loop and a second leg of the pair of legs of the ac line;

voltage follower means connected to the capacitor for generating a scaling factor on the basis of an average dc capacitor voltage for the capacitor;

scaling means connected to the voltage follower means and to the ac line for scaling a voltage of the ac line to form a trajectory for a line current;

a comparator connected to the scaling means and adapted to receive an actual line current for comparing the trajectory for the line current with the actual line current;

voltage polarity sensing means connected to the ac line for determining when the voltage of the ac line is negative and when the voltage of the ac line is positive; and the comparator being operatively connected to the first switching loop for actively controlling a shape of the line current and the voltage polarity sensing means being operatively connected to the second switching loop for actively following the polarity of the line current, while the line current is being shaped so that the line current is made to follow the shape of and be in phase with a line voltage.

2. A filter according to claim 1, wherein the first switching loop comprises a first pair of switches ($S_1$, $S_2$) connected in series across the capacitor, the inductor being connected between the first pair of switches, the second switching loop comprising a second pair of switches ($S_3$, $S_4$) connected in series across the capacitor, the first leg of the ac line being connected between the second pair of switches.

3. A filter according to claim 2, wherein the voltage follower means comprises a voltage divider connected across the capacitor and means for filtering all frequency component except dc components of the capacitor voltage after it is passed through the voltage divider.

4. A filter according to claim 2, wherein the scaling means comprises a multiplier for multiplying the scaling factor by a quantity corresponding to the ac line voltage.

5. A filter according to claim 2, wherein the voltage polarity sensing means comprises a zero-crossing detector connected to the ac line, one switch of the second pair of switches being connected directing to the zero-crossing detector and the other switch of the second pair of switches being connected through an inverter to the zero-crossing detector.

6. A filter according to claim 5, wherein the voltage follower means comprises a voltage divider connected to the capacitor, a low-pass filter connected to the voltage divider for generating the scaling factor, the scaling means comprising a multiplier connected to the low-pass filter and to the ac line for multiplying a value corresponding to the voltage of the ac line by the scaling factor to generate the trajectory of the line current, the multiplier being connected to the comparator for applying the trajectory of the line current to the comparator.

7. A filter according to claim 6, including a transformer connected to the ac line for generating the value corresponding to the ac line voltage, the transformer being connected to the multiplier and to the zero-crossing detector.

8. A process for filtering a single-phase ac line, used to power multiple nonlinear loads, the ac line having opposite legs, comprising:

connecting a first switching loop containing a capacitor for carrying a capacitor voltage, to an inductor for carrying an inductor current;

connecting a second switching loop which also contains the capacitor directly to one leg of the ac line;

connecting the inductor to the other leg of the ac line;

following the voltage across the capacitor to generate a scaling factor on the basis of an average dc capacitor voltage for the capacitor;

forming a trajectory for a line current based on a scaling of a line voltage based on the scaling factor;

comparing an actual line current of the ac line to the trajectory for the line current;

detecting a voltage polarity for the ac line voltage to determine when the voltage of the ac line is negative and when the voltage of the ac line is positive;

controlling the shape of the line current by activating the first switching loop on the basis of the comparison between the actual line current and the trajectory for the line current; and controlling the second switching loop based on the detected voltage polarity while the line current is being shaped to cause the line current to follow the shape in a manner which is in phase to the line voltage.

9. A process according to claim 8, including forming the trajectory for the line current by multiplying the scaling factor by the ac voltage.

10. A process according to claim 9, including detecting the plurality of the line voltage by detecting a zero-crossing for the line voltage.

11. A process according to claim 10, including following of the capacitor voltage by low-pass filtering the capacitor voltage to generate the scaling factor.

\* \* \* \* \*